United States Patent
Lamers et al.

(10) Patent No.: US 7,868,085 B2
(45) Date of Patent: *Jan. 11, 2011

(54) AQUEOUS DISPERSION COMPRISING A BRANCHED TRIOL HAVING TRIMELLITIC ANHYDRIDE AND ASSOCIATED METHOD

(75) Inventors: Paul H. Lamers, Allison Park, PA (US); Christopher A. Verardi, Pittsburgh, PA (US); Michele L. Meli, Ambridge, PA (US); Carolyn A.K. Novak, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 713 days.

This patent is subject to a terminal disclaimer.

(21) Appl. No.: 11/773,482

(22) Filed: Jul. 5, 2007

(65) Prior Publication Data

US 2009/0007819 A1    Jan. 8, 2009

(51) Int. Cl.
*C08L 67/00* (2006.01)

(52) U.S. Cl. .................. 524/600; 524/601; 523/501

(58) Field of Classification Search .............. 524/600, 524/601; 523/501
See application file for complete search history.

(56) References Cited

U.S. PATENT DOCUMENTS

| 5,580,926 | A | * | 12/1996 | Shalati et al. | 525/108 |
| 5,589,228 | A | * | 12/1996 | Wegner et al. | 427/407.1 |
| 6,369,133 | B2 | | 4/2002 | Kitabatake | 523/410 |
| 7,163,979 | B2 | | 1/2007 | Okazaki et al. | 524/539 |
| 7,632,570 | B2 | * | 12/2009 | Lamers et al. | 428/414 |
| 2006/0188738 | A1 | | 8/2006 | Jennings et al. | 428/480 |

FOREIGN PATENT DOCUMENTS

EP    1 454 971 B1    2/2006
JP    2002121363 A  *  4/2002

* cited by examiner

*Primary Examiner*—Tae H Yoon
(74) *Attorney, Agent, or Firm*—Steven W. Hays

(57) ABSTRACT

An aqueous dispersion comprising a reaction product of trimellitic anhydride and a polyol, wherein the molar ratio of trimellitic anhydride to polyol in the reaction product ranges from 1:2 to 1:4, and wherein the reaction product is further reacted with an anhydride to form another reaction product. A method of making a resin comprising the reaction product described above is also disclosed.

16 Claims, No Drawings

AQUEOUS DISPERSION COMPRISING A BRANCHED TRIOL HAVING TRIMELLITIC ANHYDRIDE AND ASSOCIATED METHOD

BACKGROUND OF THE INVENTION

1. Field of the Invention

The present invention relates to an aqueous dispersion comprising the reaction product of trimellitic anhydride and a polyol.

2. Background Information

Coatings for automotive applications such as primers and topcoats typically have a number of desirable properties. For example, use of low amounts of organic solvent in a coating composition is often desired for environmental reasons. Additionally, a high solid content coating is also often desired so that resin and pigment can be transferred to a substrate surface as efficiently as possible, resulting in increased application robustness. In addition to the properties listed above, the physical properties of a coating such as adhesion, solvent resistance, and/or appearance should meet automotive industry standards. Attaining all of these characteristics is difficult and often certain properties have to be compromised so that other properties can be upgraded. For example, a compromise between (i) the appearance of a particular coating, and (ii) the coating's chip resistance is often taken into consideration when formulating a coating composition since an increase in a coating's appearance typically leads to a decrease in the coating's chip resistance and vice versa. A coating that minimizes and/or eliminates the inverse relationship between a coating's appearance and chip resistance is therefore desired.

SUMMARY OF THE INVENTION

The present invention is directed to an aqueous dispersion comprising the reaction product of trimellitic anhydride and a polyol, wherein the molar ratio of the trimellitic anhydride to polyol in the reaction product ranges from 1:2 to 1:4, and wherein the reaction product is further reacted with an anhydride to form another reaction product.

The present invention is also directed to a method of producing a resin comprising (a) reacting a trimellitic anhydride with a polyol, wherein the molar ratio of trimellitic anhydride to polyol in the reaction product ranges from 1:2 to 1:4; and (b) reacting the reaction product of step (a) with an anhydride.

The present invention is further directed to a substrate comprising a coating applied onto at least a portion of the substrate. The coating comprises a reaction product of trimellitic anhydride and polyol, wherein the molar ratio of trimellitic anhydride to polyol in the reaction product ranges from 1:2 to 1:4, and wherein the reaction product is further reacted with an anhydride to form another reaction product.

DETAILED DESCRIPTION OF THE INVENTION

As used herein, unless otherwise expressly specified, all numbers such as those expressing values, ranges, amounts or percentages may be read as if prefaced by the word "about", even if the term does not expressly appear. Plural encompasses singular and vice versa. For example, although reference is made herein (including the claims) to "a" trimellitic anhydride, "a" polyol, "a" polyester polyol, "an" anhydride, a mixture of any of these can be used.

When referring to any numerical range of values, such ranges are understood to include each and every number and/or fraction between the stated range minimum and maximum.

As used herein, the term "polyol" or variations thereof refers broadly to a material having an average of two or more hydroxyl groups per molecule. It will be understood, however, that a "polyol" residue or moiety in a reaction product encompasses a material that may have one or more hydroxyl groups per molecule.

As used herein, the term "polymer" refers broadly to prepolymers, oligomers and both homopolymers and copolymers; the prefix "poly" refers to two or more.

As used herein, the term "trimellitic anhydride" or variations thereof encompasses substituted or unsubstitued trimellitic anhydride as well as the acid counterpart to trimellitic anhydride.

As used herein, the term "diacid" or variations thereof also includes anhydrides of the diacid.

As used herein, the term "colorant" means any substance that imparts color and/or other opacity and/or other visual effect to the composition.

As used herein, the term "vehicle" or variations thereof includes, but is not limited, to civilian, commercial, and military land vehicles such as cars and trucks.

As stated above, in one embodiment, the present invention is directed to an aqueous dispersion comprising the reaction product of trimellitic anhydride and a polyol, wherein the molar ratio of the trimellitic anhydride to the polyester polyol in the reaction product ranges from 1:2 to 1:4, and wherein the reaction product is further reacted with an anhydride. It will be appreciated that this further reaction with anhydride renders the reaction product dispersible (e.g., water dispersible). The aqueous dispersion can be used in a coating composition that may yield a coating which exhibits a high degree of chip resistance while maintaining an overall high appearance.

It will be appreciated by those skilled in the art that the polyol should be used in an amount to avoid gelling of the reaction product. Accordingly, in one embodiment, the trimellitic anhydride is reacted with the polyol in a molar ratio of $1:\geqq 2$ and/or $1:\leqq 4$. In certain non-limiting embodiments, the molar ratio of trimellitic anhydride to polyol can range from 1:2 to 1:4. For example, the molar ratio of trimellitic anhydride to polyol can range from 1:2.3 to 1:3.3. Accordingly, certain non-limiting embodiments can include a molar ratio of trimellitic anhydride to polyol of 1:2.3, 1:2.5, 1:3, and/or 1:3.3. The reaction product produced via the reaction between trimellitic anhydride and the polyol in the ratios described above may result in a range of different compounds. For example, the reaction product may comprise a branched triol having trimellitic anhydride as the "primary branching point" of the branched triol. As used herein, the phrase "primary branching point" is meant to refer to a compound in a molecule wherein the compound connects a plurality of other compounds (branches). For example, as stated above, trimellitic anhydride can be the primary branching point of a branched triol wherein trimellitic anhydride has three polyols attached at different parts thereto. As noted above, however, one or more of the polyols may or may not have additional branching points, which would not be regarded as the "primary branching point".

The reaction product produced in the reaction between trimellitic anhydride and the polyol in the ratios described above may also comprise a compound having 2 trimellitic anhydride moieties attached to one another via a polyol moiety, wherein each trimellitic anhydride moiety further has 2 polyol moieties attached thereto. Additionally, in another embodiment, the reaction product produced in the reaction between trimellitic anhydride and the polyol may comprise a branched triol having trimellitic anhydride as the "primary branching point" as well as a polyol moiety attached to a polyol that is attached to the trimellitic anhydride.

In one embodiment, the polyol that is used in the present invention includes, but is not be limited to, a urethane diol, a polyether polyol, polytetramethylene ether glycols, polypropylene glycol, polyethylene glycol, bisphenol A, bisphenol A ethoxylates.

In another embodiment, the polyol is a polyester polyol, which can be, for example, a reaction product of a condensation reaction between a diol and a diacid. The polyester polyol can be prepared in a reaction vessel that is separate from the reaction vessel that contains the trimellitic anhydride with which the polyester polyol will be reacted. Alternatively, the formation of the polyester polyol can occur in situ in the reaction vessel that contains the trimellitic anhydride with which the polyester polyol is reacted. Suitable diols would include, but are not limited to, 1,6-hexanediol, butylethylpropanediol, 1,4-cyclohexanedimethanol, 2-methyl-1,3-propanediol, polytetramethylene ether glycols and its oligomers, polytetrahydrofuran and its oligomers, dipropylene glycol, neopentyl glycol, butane diol, tripropylene glycol, or combinations thereof. Suitable diacids would include, but are not limited to, isophthalic acid, terephthalic acid, 1,4-Cyclohexanediacid, PRIPOL, dimerized fatty acids, maleic anhydride, hexahydrophthalic anhydride, methylhexahydrophthalic anhydride, tetrahydrophthalic anhydride, phthalic anhydride, adipic acid, azelaic acid, or combinations thereof. By way of example, and not limitation, when 2 moles of diol are reacted with 1 mole of diacid via a condensation reaction, the reaction product is a linear polyester polyol having a diol-diacid-diol configuration.

In yet another embodiment, the polyester polyol is formed with small amounts of triol and/or tri-acid. The triols and/or tri-acids would include, but are not limited to, trimethylol propane (TMP) and trimethylol ethane (TME). However, it will be understood that these compounds should not be used in amounts that will cause gelling of the reaction product. It will also be understood that use of triols and/or tri-acids can result in branching in the polyol moiety itself.

In one embodiment, a polyol is reacted with trimellitic anhydride at a temperature ranging from 200° C. to 230° C. for a time period ranging from 6 hours to 10 hours. At this temperature range, the anhydride ring of trimellitic anhydride "opens" and a reaction occurs between the trimellitic anhydride and the hydroxyl functional group of the polyol such that an ester bond is formed between the "opened" trimellitic anhydride and the polyol (hereinafter, referred to as the "condensation stage"). Moreover, the reaction between the trimellitic anhydride and the polyol in the "condensation stage" also creates a carboxylic acid functional group on the "opened" trimellitic anhydride. Accordingly, the trimellitic anhydride will have two carboxylic acid functional groups that are available for further reaction. The two carboxylic acid functional groups of the open-ring trimellitic anhydride may then be reacted with additional polyols via condensation reactions to produce a branched triol. Accordingly, the reaction product will have unreacted terminal hydroxyl groups.

At least some of the reaction product that is formed during the "condensation stage", is then further reacted with an anhydride at a temperature ranging from 140° C. to 170° C. in order to render the branched triol dispersible (e.g., water dispersible). Suitable anhydrides that could be used to react with the reaction product would include, but are not limited to, trimellitic anhydride, phthalic anhydride, hexahydrophthalic anhydride, tetrahydrophthalic anhydride, methyl hexahydrophthalic anhydride, succinic anhydride, maleic anhydride. In one embodiment, 0.33 moles of trimellitic anhydride is added to 1 mole of the reaction product at a temperature ranging from 140° C. to 170° C. At this temperature range, the anhydride ring of trimellitic anhydride "opens" and a reaction occurs between the trimellitic anhydride and a hydroxyl functional group of the reaction product such that an ester bond is formed between the trimellitic anhydride and the reaction product (hereinafter, referred to as the "ring opening stage"). The reaction between trimellitic anhydride and the reaction product in the "ring opening stage" produces a carboxylic acid functional group on the "opened" trimellitic anhydride, which increases the dispersability (e.g., water dispersability) of the reaction product produced during the "ring opening stage". Moreover, the resulting reaction product, which is now dispersible, comprises a number of hydroxyl functional groups that can be used, if the dispersion is used in a coating, to cure the coating. For example, hydroxyl functional groups of the polyol can react with a melamine curing agent to form a cross-linked coating.

In one embodiment, the reaction product of the "ring opening stage" can be polymerized, using techniques that are known in the art such as free radical polymerization, with an acrylic and/or vinylic monomer to form a polyester-acrylate copolymer in the aqueous dispersion. Suitable acrylic and/or vinylic monomers which can be used in this reaction include, but are not limited to acrylic or methacrylic alkyl ester derived from alcohols having 1 to about 20 carbon atoms, or vinyl monomers. The expression (meth)acrylate with parenthesis as used herein includes methacrylate and acrylate. Suitable examples are methyl (meth)acrylate, ethyl (meth)acrylate, propyl (meth)acrylate, n-butyl (meth)acrylate, isobutyl (meth)acrylate, t-butyl (meth)acrylate and 2-ethylhexyl (meth)acrylate, maleic acid or fumaric acid dialkylesters in which the alkyl groups have 1 to 20 carbon atoms, vinylaromatics such as styrene, alpha-methylstyrene, vinyltoluene, t-butylstyrene, halogenated vinylbenzenes such as chlorostyrene, and other monomers like vinylchloride, (meth)acrylamide and (meth)acrylonitrile.

Examples of ethylenically unsaturated monomers with a functional group other than the carboxylic acid group or the carboxylic anhydride group (iii) are hydroxyethyl (meth) acrylate, hydroxypropyl (meth)acrylate, and hydroxybutyl (meth)acrylate For example, in the case where the reaction product of the "ring opening stage" comprises polymerizable double bonds, a grafting reaction may take place between the reaction product of the "ring opening stage" and the unsaturated monomers. Depending upon the acrylic monomer that is used and the number of polymerizable double bonds that are in the reaction product of the "ring opening stage", the grafting reaction may result in the generation of crosslinked microparticles. Crosslinked microparticle dispersions are particularly useful to control the rheological properties of waterborne coatings.

As stated above, this invention is also directed towards a coating composition comprising the reaction product produced during the "ring opening stage". The coating composition can further comprise an aqueous solution such as water or an organic solvent and/or one or more curing agents or crosslinking materials capable of reacting with the reaction product of the "ring opening stage" and the anhydride. The crosslinking material can be present as a mixture with an aqueous solution and the reaction product of the "ring opening stage" (conventionally referred to as a one-pack or 1K system), or in a separate composition that is mixed with the reaction product of the "ring opening stage" and aqueous solution shortly before application of the coating to a substrate (conventionally referred to as a two-pack or 2K system).

Any suitable crosslinking materials that react with hydroxy functional groups may be used. For example, suitable crosslinking materials include, but are not limited to, aminoplasts and polyisocyanates, blocked isocyanates, melamine, and mixtures thereof.

The aminoplast resins may be based on the addition products of formaldehyde with an amino- or amido-group carrying substance. In one embodiment, condensation products obtained from the reaction of alcohols and formaldehyde with melamine, urea or benzoguanamine are used. While the aldehyde employed may be formaldehyde, other similar condensation products can be made from other aldehydes, such as acetaldehyde, crotonaldehyde, acrolein, benzaldehyde, furfural, glyoxal and the like.

Condensation products of other amines and amides can also be used, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Non-limiting examples of such compounds include N,N'-dimethyl urea, benzourea, dicyandiamide, formaguanamine, acetoguanamine, glycoluril, ammeline, 3,5-diaminotriazole, triaminopyrimidine, 2-mercapto-4,6-diaminopyrimidine and carbamoyl triazines of the formula $C_3N_3(NHCOXR)_3$ where X is nitrogen, oxygen or carbon and R is a lower alkyl group having from one to twelve carbon atoms or mixtures of lower alkyl groups, such as methyl, ethyl, propyl, butyl, n-octyl and 2-ethylhexyl. Such compounds and their preparation are described in detail in U.S. Pat. No. 5,084,541 (column 2, line 50 through column 7, line 63).

The aminoplast resins may contain methylol or similar alkylol groups, and at least a portion of these alkylol groups may be etherified by reaction with an alcohol. Any monohydric alcohol can be employed for this purpose, including, but not limited to, methanol, ethanol, propanol, butanol, pentanol, hexanol, heptanol, as well as benzyl alcohol and other aromatic alcohols, cyclic alcohols such as cyclohexanol, monoethers of glycols, and halogen-substituted or other substituted alcohols such as 3-chloropropanol and butoxyethanol. In one embodiment, the aminoplast resins are substantially alkylated with methanol or butanol.

Any suitable polyisocyanate may be used as a crosslinking material. The polyisocyanate can be prepared from a variety of isocyanate-containing materials and can be a blocked polyisocyanate. Examples of suitable polyisocyanates include, but are not limited to, trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanates can be used. Examples of suitable blocking agents include those materials that would unblock at elevated temperatures such as lower aliphatic alcohols including methanol, oximes such as methyl ethyl ketoxime, lactams such as caprolactam and pyrazoles such as dimethylpyrazole.

The amount of the crosslinking material can vary. In one embodiment, the crosslinking material may be present in an amount ranging from 10% to 40% on a basis of total weight of the reaction product and the crosslinking material.

In one embodiment, the coating composition may also contain catalysts to accelerate the cure of the crosslinking agent with reactive groups on the reaction product of the "ring opening stage". Suitable catalysts for melamine would include, but are not limited to, phosphorous or sulfur based acids such as phosphate, epoxy modified phosphates, sulfates, and sulfonates. For example, the melamine catalyst could be phenylacid phosphate and/or dodecylbenzenesulfonic acid. The catalyst may be present in the coating composition in varying amounts. In one embodiment, the catalyst may be present in an amount ranging from 0% to 6%.

In other embodiments, additional ingredients such as colorants and fillers can be present in the coating. Any suitable colorants and fillers may be used. For example, the colorant can be added to the coating in any suitable form, such as discrete particles, dispersions, solutions and/or flakes. A single colorant or a mixture of two or more colorants can be used in the coatings of the present invention. It should be noted that, in general, the colorant can be present in a layer of the multi-layer composite in any amount sufficient to impart the desired property, visual and/or color effect.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPP red BO"), titanium dioxide, carbon black, zinc oxide, antimony oxide, etc. and organic or inorganic UV opacifying pigments such as iron oxide, transparent red or yellow iron oxide, phthalocyanine blue and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

In one embodiment, special effect compositions that may be used in one or more layers of the multi-layer coating composite include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as reflectivity, opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In another embodiment, a photosensitive composition and/or photochromic composition, which reversibly alters its color when exposed to one or more light sources, can be used in a number of layers in the multi-layer composite. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In yet another embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

In general, the colorant can be present in the coating composition in any amount sufficient to impart the desired property, visual and/or color effect. The colorant may comprise from 1 to 65 weight percent of the present compositions, such as from 3 to 40 weight percent or 5 to 35 weight percent, with weight percent based on the total weight of the composition.

As stated above, the coating can further comprise filler. Example fillers that can be used in the coating include, but not are limited to, barium sulfate, magnesium silicate, calcium carbonate, and silica. The amount of fillers and pigments can vary. In one embodiment, the fillers may be present in amounts of up to 1.5 times the resin content of the coating composition.

Other optional ingredients that can be added to the coating include, but are not limited to, anti-oxidants, UV-absorbers and hindered amine light stabilizers, such as for example, hindered phenols, benzophenones, benzotriazoles, triazoles, triazines, benzoates, piperidinyl compounds and mixtures thereof. These ingredients may be added in any suitable amounts. In one embodiment, each ingredient may be added in amounts up to 3% based on the total weight of resin solids of the composition. Other optional ingredients may include co-solvents, coalescing aids, defoamers, plasticizers, associative thickeners, bactericides and the like.

Moreover, in certain embodiments, one or more additional film-forming resins are also used in the coating. For example, the coating compositions can comprise any of a variety of thermoplastic and/or thermosetting compositions known in the art. The coating compositions may be water-based or solvent-based liquid compositions, or, alternatively, in solid particulate form, i.e., a powder coating.

In one embodiment, the film forming agent is a film forming polymer or resin having functional groups that are reactive with either themselves or a crosslinking agent. The film-forming resin can be selected from, for example, acrylic polymers, polyester polymers, polyurethane polymers, polyamide polymers, polyether polymers, bisphenol A based epoxy polymers, polysiloxane polymers, copolymers thereof, and mixtures thereof. Generally, these polymers can be any polymers of these types made by any method known to those skilled in the art. Such polymers may be solvent borne or water dispersible, emulsifiable, or of limited water solubility. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups and tris-alkylcarbamoyltriazine) mercaptan groups, anhydride groups, acetoacetate acrylates, uretidione and combinations thereof. Crosslinking materials for these functional groups can be those described above or any other suitable crosslinking materials known in the art or combinations thereof.

The coating compositions may also include a solvent. Suitable solvents include water, organic solvent(s) and/or mixtures thereof. Suitable solvents include glycols, glycol ether alcohols, alcohols, mineral spirits. "Non-aqueous solvent" and like terms means that less than 50% of the solvent is water. For example, less than 10%, or even less than 5% of the solvent can be water. It will be understood that mixtures of solvents, including or excluding water in an amount of less than 50%, can constitute a "non-aqueous solvent".

The coating composition of the present invention can be applied onto a number of substrates. Accordingly, the present invention is further directed to a substrate that is coated, at least in part, with one or more of the compositions described herein. It will be understood that the coating composition can be applied onto a substrate as a monocoat or as one or more coats in a multi-layer coating composite. Non-limiting examples of a suitable substrate can include a metal or a metal alloy. For example, the metal or metal alloy can include aluminum, steel, or titanium. In one embodiment, the steel could be cold rolled steel, electrogalvanized steel, and hot dipped galvanized steel. In one embodiment, at least a portion of the surface of the metallic surface onto which the coating is applied is pretreated with phosphate, such as zinc phosphate. In another embodiment, the coated substrate may comprise a portion of a vehicle such as a vehicular body (e.g., without limitation, door, body panel, trunk deck lid, roof panel, hood, and/or roof) and/or a vehicular frame.

Furthermore, the coating composition of the present invention may be applied to the substrate to impart a wide variety of properties such as, but not limited to, corrosion resistance, chip resistance, filling (i.e., ability to hide underlying substrate roughness), abrasion resistance, impact damage, flame and/or heat resistance, chemical resistance, UV light resistance, and/or structural integrity.

In one embodiment, the coating of the present invention is utilized in a primer layer that is part of a multi-layer coating composite comprising a substrate with various coating layers. The coating layers could include a pretreatment layer, such as a phosphate layer (e.g., zinc phosphate layer), an electrocoating layer, and suitable top coat layers (e.g., base coat, clear coat layer, pigmented monocoat, and color-plus-clear composite compositions). It is understood that suitable topcoat layers include any of those known in the art, and each independently may be waterborne, solventborne, in solid particulate form (i.e., a powder coating composition), or in the form of a powder slurry. The top coat typically includes a film-forming polymer, crosslinking material and, if a colored base coat or monocoat, one or more pigments. In one embodiment, the primer layer is disposed between the electrocoating layer and the base coat layer.

As demonstrated in the examples below, the coating of the present invention exhibits a high degree of chip resistance while maintaining an overall high appearance and hardness when compared to other coatings. The hardness of a coating, such as a primer layer, is a desirable property in the automotive industry since automotive manufacturers routinely sand the primer layer on a vehicle in order to remove any defects prior to application of a topcoat layer. A mechanized sanding device onto which fine (400-600) grit sandpaper is mounted is routinely used during the sanding process. Typically, the mechanized sanding device generates heat during the sanding process. The heat generated by the mechanized sanding device can soften the primer layer on the vehicle which can result in the premature "gumming up" of the sandpaper thereby rending the sandpaper useless. Accordingly, in addition to the properties listed above, it is also desirable to have a coating that maintains a high degree of hardness while minimizing and/or eliminating any adverse affect on the chip resistance of the coating.

It will be understood that the reaction products which are described above are based on the average statistical structure obtained from a particular reaction. For example, the reaction of 3 moles of diol with 1 mole of trimellitic anhydride to effectively 0 AV will yield a statistical distribution of materials. In this particular reaction, the average statistical structure will be a branched triol having trimellitic anhydride as the primary branching point. Those skilled in the art, however, will recognize that the reaction could also yield a statistical distribution of other materials as well. For example, some of the other materials could have structures that either have a higher or lower molecular weight than the branched triol. Moreover, some of the other materials could have structures with either more or fewer branching points than the branched triol.

Whereas particular embodiments of this invention have been described above for purposes of illustration, it will be evident to those skilled in the art that numerous variations of the details of the present invention may be made without departing from the invention as defined in the appended claims.

EXAMPLES

Example 1

An aqueous dispersion in accordance with one embodiment of the present invention was prepared from the following ingredients:

|  | Raw Material | Amount (g) |
|---|---|---|
| Chg 1 | Neopentyl glycol | 275 |
|  | Dipropylene glycol | 362 |
|  | Isophthalic acid | 448 |
|  | Butyl stannoic acid | 0.4 |
|  | Trimellitic anhydride | 173 |
| Chg 2 | Trimellitic anhydride | 57 |
| Chg 3 | DOWANOL DPM[1] | 89 |
| Chg 4 | DMEA (Dimethylamine) | 56.4 |
|  | DI Water (Deionized water) | 508 |
| Chg 5 | DI Water | 855 |

[1]Available from Dow Chemical Co.

To a four necked, 5 liter reaction flask outfitted with a stirrer, gas inlet, thermometer, packed column and condenser was added the contents of Chg 1. The reaction mixture was heated in stages to 220° C. and held until the acid value was <4. Care was taken that the distillate temperature did not exceed 100° C. Upon reaching the target acid value range, a sample was removed, and the Gardner Holdt viscosity of U was measured at 60% TS in Butyl Cellosolve. Vacuum was then applied to remove any residual water as the reaction was cooled to 160° C. The contents of Chg 2 were then added to the flask at 160° C. and the reaction mixture was held for 30 minutes. The reaction mixture was then cooled and at 150° C. the contents of Chg 3 were added. When the reaction mixture was cooled to <100° C., an aqueous dispersion was produced by adding Chg 4 and Chg 5. The final dispersion had a solids content of 44% and a pH value of 6.9.

Example 2

An aqueous dispersion in accordance with one embodiment of the present invention was prepared from the following ingredients:

|  | Raw Material | Amount (g) |
|---|---|---|
| Chg 1 | 1,6-Hexanediol | 425 |
|  | Dipropylene glycol | 482 |
|  | Isophthalic acid | 598 |
|  | Butyl stannoic acid | 0.7 |
|  | Trimellitic anhydride | 230 |

-continued

| | Raw Material | Amount (g) |
|---|---|---|
| Chg 2 | Trimellitic anhydride | 76 |
| Chg 3 | Dowanol DPM | 162 |
| Chg 4 | DMEA | 75.2 |
| | DI Water | 677 |
| Chg 5 | DI Water | 1171 |

To a four necked, 5 liter reaction flask outfitted with a stirrer, gas inlet, thermometer, packed column and condenser was added the contents of Chg 1. The reaction mixture was heated in stages to 220° C. and held until the acid value was <4. Care was taken that the distillate temperature did not exceed 100° C. Vacuum was then applied to remove any residual water as the reaction was cooled to 160° C. The contents of Chg 2 were then added to the flask at 160° C. and the reaction mixture was held for 30 minutes. The reaction mixture was then cooled and at 150° C. the contents of Chg 3 were added. When the reaction mixture was cooled to <100° C., an aqueous dispersion was produced by adding Chg 4 and Chg 5. The final dispersion had a solids content of 44% and a pH value of 7.0.

Example 3

An aqueous dispersion in accordance with one embodiment of the present invention was prepared from the following ingredients:

| | Raw Material | Amount (g) |
|---|---|---|
| Chg 1 | Neopentyl glycol | 245 |
| | Dipropylene glycol | 322 |
| | Isophthalic acid | 365 |
| | PRIPOL 1013[2] | 115 |
| | Butyl stannoic acid | 0.7 |
| | Trimellitic anhydride | 154 |
| Chg 2 | Trimellitic anhydride | 50.7 |
| Chg 3 | Dowanol DPM | 86 |
| Chg 4 | DMEA | 52.8 |
| | DI Water | 475 |
| Chg 5 | DI Water | 840 |

[2]Available from Uniqema

To a four necked, 5 liter reaction flask outfitted with a stirrer, gas inlet, thermometer, packed column and condenser was added the contents of Chg 1. The reaction mixture was heated in stages to 220° C. and held until the acid value was <4. Care was taken that the distillate temperature did not exceed 100° C. Vacuum was then applied to remove any residual water as the reaction was cooled to 160° C. The contents of Chg 2 were then added to the flask at 160° C. and the reaction mixture was held for 30 minutes. The reaction mixture was then cooled and at 150° C. the contents of Chg 3 were added. When the reaction mixture was cooled to <100° C., an aqueous dispersion was produced by adding Chg 4 and Chg 5. The final dispersion had a solids content of 44% and a pH value of 6.8.

Example 4

A Urethane Diol was prepared from the following ingredients:

| | Raw Material | Amount (g) |
|---|---|---|
| Chg 1 | Dytek A | 696 |
| | Propylene Carbonate | 1346 |
| Chg 2 | Dowanol DPM | 511 |

To a four necked, 3 liter reaction flask outfitted with a stirrer, gas inlet, thermometer, packed column and condenser was added the contents of Chg 1 and heated to 60° C. The contents of Chg 2 were added at such a rate to keep the exotherm <120° C. After the addition was complete, the reaction mixture was heated to 140° C. and held until the mEq Amine was <0.1. The reaction mixture was then cooled to 90° C. and the contents of Chg 2 were added and cooling was continued. The final resin solution had a solids content of 76% and a Gardner Holdt Viscosity of Z2+.

Example 5

An aqueous dispersion in accordance with one embodiment of the present invention was prepared from the following ingredients:

| | Raw Material | Amount (g) |
|---|---|---|
| Chg 1 | Neopentyl glycol | 337 |
| | Dipropylene glycol | 442 |
| | Isophthalic acid | 548 |
| | Butyl stannoic acid | 1 |
| | Trimellitic anhydride | 211 |
| Chg 2 | Trimellitic anhydrdide | 69.7 |
| Chg 3 | Urethane Diol Example 4 | 320 |
| Chg 4 | DMEA | 61.4 |
| | DI Water | 552.4 |
| Chg 5 | DI Water | 1027 |

To a four necked, 5 liter reaction flask outfitted with a stirrer, gas inlet, thermometer, packed column and condenser was added the contents of Chg 1. The reaction mixture was heated in stages to 220° C. and held until the acid value was <4. Care was taken that the distillate temperature did not exceed 100° C. Upon reaching the target acid value range, a sample was removed, and the Gardner Holdt viscosity of V was measured at 60% TS in Butyl Cellosolve. Vacuum was then applied to remove any residual water as the reaction was cooled to 160° C. The contents of Chg 2 were then added to the flask at 160° C. and the reaction mixture was held for 30 minutes. The reaction mixture was then cooled and at 150° C. the contents of Chg 3 were added. When the reaction mixture was cooled to <100° C., an aqueous dispersion was produced by adding Chg 4 and Chg 5. The final dispersion had a solids content of 50% and a pH value of 7.0.

Example 6

An aqueous dispersion in accordance with one embodiment of the present invention was prepared from the following ingredients:

| | Raw Material | Amount (g) |
|---|---|---|
| Chg 1 | Neopentyl glycol | 275 |
| | Dipropylene glycol | 362 |

-continued

|  | Raw Material | Amount (g) |
|---|---|---|
|  | Isophthalic acid | 299 |
|  | Maleic anhydride | 88 |
|  | Butyl stannoic acid | 0.4 |
|  | Trimellitic anhydride | 173 |
| Chg 2 | Trimellitic anhydrdide | 57 |
| Chg 3 | Dowanol DPM | 87 |
| Chg 4 | DMEA | 50.5 |
|  | DI Water | 455 |
| Chg 5 | DI Water | 880 |

To a four necked, 5 liter reaction flask outfitted with a stirrer, gas inlet, thermometer, packed column and condenser was added the contents of Chg 1. The reaction mixture was heated in stages to 220° C. and held until the acid value was <4. Care was taken that the distillate temperature did not exceed 100° C. Upon reaching the target acid value range, a sample was removed, and the Gardner Holdt viscosity of T was measured at 60% TS in Butyl Cellosolve. Vacuum was then applied to remove any residual water as the reaction was cooled to 160° C. The contents of Chg 2 were then added to the flask at 160° C. and the reaction mixture was held for 30 minutes. The reaction mixture was then cooled and at 150° C. the contents of Chg 3 were added. When the reaction mixture was cooled to <100° C., an aqueous dispersion was produced by adding Chg 4 and Chg 5. The final dispersion had a solids content of 44% and a pH value of 6.9.

Example 7

An aqueous dispersion in accordance with one embodiment of the present invention was prepared from the following ingredients:

|  | Raw Material | Amount (g) |
|---|---|---|
| Chg 1 | Aqueous Dispersion of Example 6 | 600 |
|  | Di Water | 125 |
| Chg 2 | Styrene | 66 |
| Chg 3 | Ferrous ammonium sulfate | 0.00135 |
|  | Isoascorbic acid | 0.203 |
|  | Di Water | 15 |
| Chg 4 | 35% Hydrogen Peroxide | 0.93 |
|  | DI Water | 5 |
| Chg 5 | DMEA | 1.8 |
|  | Di Water | 5 |

To a four necked, 2 liter reaction flask outfitted with a stirrer, gas inlet, thermometer was added the contents of Chg 1. While heating to 35° C., vacuum was applied for 10 minutes to remove dissolved oxygen. The contents of Chg 2 are then added followed by stirring for 5 minutes. When the reaction mixture has reached 35° C., the contents of Chg 3 are added followed by 3 minutes stirring. The contents of Chg 4 are then added, and an exothermic reaction ensues raising the temperature to 53° C. The reaction is then heated to 60° C. and held for 1 hour. After this time there is no residual monomer present. The reaction is cooled and Chg 5 is added. The final dispersion had a solids content of 40% and a pH value of 6.9.

A 5% tetrahydrofuran solution of the dispersion shows significant turbidity, indicating the presence of crosslinked microparticles.

Polyester A and Polyester Acrylate B

Each of the paint examples below utilized either Polyester A or Polyester Acrylate B as an ingredient in the pigment paste which was used to make a particular paint.

Polyester A

Polyester A was prepared from the following ingredients:

|  | Raw Material | Amount (g) |
|---|---|---|
| Chg 1 | Epon 880 | 188 |
|  | Isononanoic Acid | 158 |
|  | Ethyltriphenylphosphonium iodide | 0.35 |
| Chg 2 | Macol 98[1] | 492 |
|  | 1,4-Cyclohexanedimethanol (CHDM) | 360 |
| Chg 3 | Maleic anhydride | 49 |
|  | Trimellitic anhydride | 288 |
| Chg 4 | Dowanol DPM[2] | 165 |
| Chg 5 | Dimethylethanolamine (DMEA) | 52.2 |
|  | DI Water | 470 |
| Chg 6 | DI Water | 2329 |

[1]Bisphenol A-ethylene oxide condensate available from BASF Corp.
[2]Dipropylene glycol monomethyl ether available from Dow Chemical Co.

To a four necked, 5 liter reaction flask outfitted with a stirrer, gas inlet, thermometer and condenser was added the contents of Chg 1. The reaction mixture was heated to 150° C. and held until the residual acid value was <3. The contents of Chg 2 and Chg 3 were then added to the flask and the reaction mixture was heated to 190° C. max ensuring that the column head temperature did not exceed 100° C. A slow nitrogen stream helped remove the water condensate. As soon as an acid number of 33 was reached, the reaction was cooled to 135° C. at which point Chg 4 was added with continued cooling to <100° C. When the reaction mixture was cooled to <100° C., an aqueous dispersion was produced by adding Chg 5 and Chg 6. The final dispersion had a solids content of 32% and a pH value of 6.5.

Polyester Acrylate B

Polyester Acrylate B was prepared from the following ingredients:

|  | Raw Material | Amount (g) |
|---|---|---|
| Chg 1 | Polyester A | 1500 |
|  | DMEA | 2.3 |
|  | DI Water | 240 |
| Chg 2 | Hydroxypropylmethacrylate | 33.2 |
|  | Styrene | 66.4 |
|  | Butyl Acrylate | 66.4 |
| Chg 3 | Isoascorbic acid | 0.511 |
|  | DI Water | 5 |
| Chg 4 | Ferrous Ammonium Sulfate | 0.0034 |
|  | DI Water | 5 |
| Chg 5 | Hydrogen Peroxide (35%) | 2.34 |
|  | DI Water | 20 |
| Chg 6 | DMEA | 4.58 |
|  | DI Water | 5 |

To a four necked, 5 liter reaction flask outfitted with a stirrer, gas inlet, thermometer, and condenser was added the contents of Chg 1. While the reaction was heating to 35° C. vacuum was applied to remove the dissolved oxygen. Upon reaching 35° C., the vacuum was broken with a nitrogen stream and the reaction was continued under nitrogen atmosphere. Chg 2 was added followed by stirring for 5 minutes, then Chg 3 and 4 were added followed by stirring for 5 minutes. Chg 5 was then added all at once and within 2 minutes an exotherm ensued. The reaction temperature reached 55° C. within 10 minutes. The reaction was then heated to 65° C. and held for 1 hour to ensure complete monomer conversion. The reaction was then cooled to 35° C. and Chg 6 was added. A nearly transparent dispersion with a solids content of 35% and pH of 6.8 was obtained.

Paint (Primer) Examples

Paint Example 1

A pigment paste was made with the following ingredients:

| Raw Material | Amount (g) |
| --- | --- |
| Polyester Acrylate B | 40 |
| Deionized water | 5.46 |
| Dimethyl ethanol amine (50% Solution) | 0.25 |
| Drewplus L108 Defoamer[1] | 1.02 |
| Byk-181 Grind additive[2] | 1.85 |
| Carbon Black[3] | 0.14 |
| Silica[4] | 0.50 |
| Barium Sulfate[5] | 25.95 |
| Titanium Dioxide[6] | 23.42 |

[1]Available from Ashland Chemicals
[2]Available from Byk-Chemie
[3]Available from Columbian Chemicals
[4]Available from DeGussa
[5]Available from Sachtleben Chemie
[6]Available from Millennium Inorganics These ingredients were dispersed with a high speed cowls agitator for 1 hour, and then milled for 1½ hours on an Eiger media mill.

After the pigment paste was dispersed and milled, the following ingredients were added to the pigment paste:

| Raw Materials | Amount (g) |
| --- | --- |
| Aqueous Dispersion of Example 1 | 131.76 |
| Dimethyl ethanol amine (50% Solution) | 1.38 |
| Resimene 745[7] | 20.00 |
| Mineral Spirits | 1.60 |
| M-Pyrol | 3.00 |
| Octanol | 1.20 |
| Byk-346 Additive[8] | 2.09 |
| Byk-381 Additive[9] | 1.92 |
| Urethanediol[10] (component B) | 11.36 |
| Neutralized phosphatized epoxy solution[11] (component C) | 12.50 |
| Deionized water | 21.10 |

[7]Available from INEOS
[8]Available from Byk-Chemie
[9]Available from Byk-Chemie
[10]Available from King Industries
[11]Available from PPG Industries, Inc.

The paint sample was then reduced to 46 seconds #4 Din Cup viscosity.

Paint Example 2

A pigment paste was made with the following ingredients:

| Raw Material | Amount (g) |
| --- | --- |
| Polyester A | 43.75 |
| Deionized water | 5.99 |
| Dimethyl ethanol amine (50% Solution) | 0.29 |
| Drewplus L108 Defoamer | 1.02 |
| Byk-181 Grind additive | 1.87 |
| Carbon Black | 0.14 |
| Silica | 0.50 |
| Barium Sulfate | 25.95 |
| Titanium Dioxide | 23.42 |

These ingredients were dispersed with a high speed cowls agitator for 1 hour, and then milled for 1½ hours on an Eiger media mill.

After the pigment paste was dispersed and milled, the following ingredients were added to the pigment paste:

| Raw Materials | Amount (g) |
| --- | --- |
| Aqueous Dispersion of Example 1 | 127.27 |
| Dimethyl ethanol amine (50% Solution) | 1.33 |
| Resimene 745 | 20.00 |
| Mineral Spirits | 1.60 |
| M-Pyrol | 3.00 |
| Octanol | 1.20 |
| Byk-346 Additive | 2.09 |
| Byk-381 Additive | 1.92 |
| Urethanediol (component B) | 11.36 |
| Neutralized phosphatized epoxy solution (component C) | 12.50 |
| Deionized water | 14.06 |

The paint sample was then reduced to 52 seconds #4 Din Cup viscosity.

Paint Example 3

A pigment paste was made with the following ingredients:

| Raw Material | Amount (g) |
| --- | --- |
| Polyester Acrylate B | 80.00 |
| Deionized water | 10.92 |
| Dimethyl ethanol amine (50% Solution) | 0.57 |
| Drewplus L108 Defoamer | 2.03 |
| Byk-181 Grind additive | 3.71 |
| Carbon Black | 0.27 |
| Silica | 1.00 |
| Barium Sulfate | 51.89 |
| Titanium Dioxide | 46.84 |

These ingredients were dispersed with a high speed cowls agitator for 1 hour, and then milled for 1½ hours on an Eiger media mill.

After the pigment paste was dispersed and milled, the following ingredients were added to the pigment paste:

| Raw Materials | Amount (g) |
| --- | --- |
| Aqueous Dispersion of Example 1 | 98.82 |
| Dimethyl ethanol amine (50% Solution) | 1.33 |
| Resimene 745 | 19.66 |
| Mineral Spirits | 1.60 |
| M-Pyrol | 3.00 |
| Octanol | 1.20 |
| Byk-346 Additive | 2.09 |
| Byk-381 Additive | 1.92 |
| Urethanediol (component B) | 11.36 |
| Neutralized phosphatized epoxy solution (component C) | 12.00 |
| Deionized water | 12.92 |

The paint sample was then reduced to 47 seconds #4 Din Cup viscosity.

Paint Example 4

A pigment paste was made with the following ingredients:

| Raw Material | Amount (g) |
| --- | --- |
| Polyester A | 43.75 |
| Deionized water | 5.99 |
| Dimethyl ethanol amine (50% Solution) | 0.29 |
| Drewplus L108 Defoamer | 1.02 |
| Byk-181 Grind additive | 1.87 |
| Carbon Black | 0.14 |
| Silica | 0.50 |
| Barium Sulfate | 25.95 |
| Titanium Dioxide | 23.42 |

These ingredients were dispersed with a high speed cowls agitator for 1 hour, and then milled for 1½ hours on an Eiger media mill.

After the pigment paste was dispersed and milled, the following ingredients were added to the pigment paste:

| Raw Materials | Amount (g) |
| --- | --- |
| Aqueous Dispersion of Example 3 | 131.76 |
| Dimethyl ethanol amine (50% Solution) | 1.38 |
| Resimene 745 | 20.00 |
| Mineral Spirits | 1.60 |
| M-Pyrol | 3.00 |
| Octanol | 1.20 |
| Byk-346 Additive | 2.09 |
| Byk-381 Additive | 1.92 |
| Urethanediol (component B) | 11.36 |
| Neutralized phosphatized epoxy solution (component C) | 12.50 |
| Deionized water | 9.25 |

The paint sample was then reduced to 50 seconds #4 Ford Cup viscosity.

Coating Performance

The above waterborne primer compositions in Paint Examples 1-4 were compared to Paint Example 5. Paint Example 5 is a grey, commercially available, waterborne primer from DuPont used at Hyundai—Alabama. The test substrates were 4 inch×12 inch CRS panels which are available from ACT Laboratories of Hillsdale, Mich. The panels were electrocoated with Cormax 6, a cationically electrodepositable primer commercially available from DuPont. Paint Examples 1-5 were spray applied (two coats automated spray with 60 second ambient flash between coats) at 60% relative humidity and 21° C. to give a dry film thickness of 40 to 50 microns. The panels were then flashed for 5 minutes at ambient temperature, dehydrated for 5 minutes at 80° C., and then cured for 25 minutes at 150° C. A second set of panels was flashed 5 minutes at ambient temperature, dehydrated 5 minutes at 80° C., and then cured 25 minutes at 180° C. to simulate an overbake scenario.

The panels were basecoated with JWBMB202x Black Waterborne Basecoat which is commercially available from PKAF. The basecoat was applied in two coats by automated spray, flashed for 5 minutes at ambient conditions and dehydrated for 5 minutes at 80° C., to a dry film thickness of 12 microns. The panels were then topcoated with JCCM1200 solventborne clearcoat which is commercially available from PKAF. The clearcoat was applied in two coats by automated spray, flashed for 10 minutes at ambient conditions and fully cured for 30 minutes at 150° C., to a dry film thickness of 45 microns. The appearance of each panel was then measured using a BYK-wavescan which is commercially available from BYK-Gardner. The instrument optically scans the wavy, light dark pattern on the surface over a distance of 10 cm and detects the reflected light intensity point by point. The measured optical profile is divided into long term waviness (LW, structure size 0.6-10 mm) and short-term waviness (SW, structure size 0.1-0.6 mm).

The test substrates used to measure sag resistance were 4 inch×18 inch CRS panels which are available from ACT Laboratories of Hillsdale, Mich. The panels were electrocoated with ED6060, a cationically electrodepositable primer commercially available from PPG. 5 mm holes were punched through each panel along the entire length of each panel to ensure proper sag capability. The panels were then primed with Paint Example 3 and flashed vertically to allow the primer to flow from these holes. Sag was then measure in mm and dry film thickness was recorded against the sag point of a control primer.

The test substrates used to measure for pop resistance were 4 inch×18 inch CRS panels which are available from ACT Laboratories of Hillsdale, Mich. The panels were electrocoated with ED6060, a cationically electrodepositable primer commercially available from PPG. The panels were then primed and flashed horizontally for 5 minutes at ambient temperature, dehydrated for 5 minutes at 80° C., and then cured for 25 minutes at 150° C. Pop was then evaluated and recorded by dry film thickness.

The appearance and application robustness testing results are shown in Table 1. The data presented in Table 1 shows that Paint Examples 1-4 had improved topcoat appearance when compared to DuPont Hyundai—Alabama commercial control at a similar level of sag resistance. Paint Examples 1-4 also show equal appearance to PPG BBDC commercial control at a higher level of sag resistance.

TABLE 1

| | Paint Solids | Viscosity (sec) | LW | SW | Pop (μ) | Sag (μ) |
| --- | --- | --- | --- | --- | --- | --- |
| Paint Example 1 | 52 | 46 | 3 | 14 | 51 | 51 |
| Paint Example 2 | 51 | 52 | 2 | 10 | 49 | 38 |
| Paint Example 3 | 57 | 47 | 3 | 12 | 50 | 41 |
| Paint Example 4 | 51 | 50 | 2 | 13 | 49 | 36 |
| PPG BBDC | 51 | 59 | 3 | 14 | >37 | 32 |
| Paint Example 5 - DuPont | 50 | 46 | 4 | 20 | 43 | 41 |

Additional testing was performed with Paint Example 3 and Paint Example 5 from DuPont. The test substrates were 4 inch×12 inch CRS panels which are available from ACT Laboratories of Hillsdale, Mich. The panels were electrocoated with Cormax 6, a cationically electrodepositable primer commercially available from DuPont. The panels were exposed to a nominal bake for 30 minutes at 150° C. The panels were then topcoated with HMDB300135 basecoat and HMCC1000R clearcoat, both of which are commercially available from PPG Industries.

The gloss of these panels was measured using a micro-trigloss meter available from Byk-Gardner. It is understood that higher numbers indicate higher, more desirable gloss. Gloss was evaluated at both bake conditions.

Additionally, the hardness of these test panels was measured using a Pendulum Hardness Tester and measured according to the König Method.

The solvent resistance of these panels was also tested by placing a puddle of about 10 drops of acetone onto the surface of each panel for a duration of 10 seconds. After 10 seconds the acetone was removed with a cloth towel and a wooden spatula was scratched across the surface where the acetone had been deposited. The rating given to Paint Examples 3 and 5 was determined by the amount of mar left behind by the wooden blade.

The test substrates used to measure topcoat/primer adhesion were 4 inch×12 inch CRS panels which are available from ACT Laboratories of Hillsdale, Mich. The panels were electrocoated with Cormax 6, a cationically electrodepositable primer commercially available from DuPont. After Paint Examples 3 and 5 were applied onto a panel, the panel was baked for 30 minutes at 180° C. and then topcoated with HMDB300135 basecoat and HMCC1000R clearcoat. After the panels were topcoated, they were baked for 20 minutes at 140° C. Topcoat/primer adhesion was then determined by subjecting the panels to a high pressure (1200 PSI), heated water (70° C.) Karcher wand (Dampfstrahlprüfung PBODC361 according to Daimler—Chrysler.)

The PVC/Oiler/Rocker Panel sealers tested for adhesion are those used commercially at the Hyundai—Alabama plant.

The physical property testing results are shown in Table 2. The data presented in Table 2 shows that Paint Example 3 had improved gloss and hardness when compared to Paint Example 5, DuPont Hyundai—Alabama control paint while maintaining chip resistance.

TABLE 2

| | Gloss (20°/60°) | König Hardness (sec) | Solvent Resistance | VDA Chip Resistance | Topcoat/Primer Adhesion[1] | Sealer Adhesion (PVC/Oiler/RPP) |
|---|---|---|---|---|---|---|
| Example 5-DuPont | 21/64 | 110 | Pass | Pass | Pass | P/P/P |
| Paint Example 3 | 85/95 | 195 | Pass | Pass | Pass | P/P/P |

The effect of cure temperature on topcoat adhesion/solvent resistance and König hardness was also investigated. These results are shown in Table 3. The data presented in Table 3 shows that Paint Example 3 had improved hardness over a range of cure temperatures while maintaining topcoat/primer adhesion.

TABLE 3

| | Bake Temp | König Hardness (sec) | Topcoat/Primer Adhesion | Solvent Resistance |
|---|---|---|---|---|
| Example 5- DuPont | 140° C. | 76 | Pass | Fail |
| | 160° C. | 117 | Pass | Pass |
| | 170° C. | 136 | Pass | Pass |
| Paint Example 3 | 140° C. | 200 | Pass | Pass |
| | 160° C. | 202 | Pass | Pass |
| | 170° C. | 203 | Pass | Pass |

The relative invariance in hardness/solvent resistance of Paint Example 3 within the cure window of 140° C.-170° C. means that the nominal primer bake temperature of 150-160° C. may be reduced to 140° C. without loss of performance.

What is claimed is:

1. An aqueous dispersion comprising the reaction product of trimellitic anhydride and a polyol, wherein the molar ratio of trimellitic anhydride to said polyol in said reaction product is 1:2 to 1:4, wherein said reaction product comprises a branched triol that has trimellitic anhydride as the primary branching point, and wherein said reaction product is further reacted with an anhydride under ring opening reaction conditions to form another reaction product.

2. The aqueous dispersion according to claim 1, wherein the molar ratio of trimellitic anhydride to said polyol in said reaction product is 1:2.3 to 1:3.3.

3. The aqueous dispersion according to claim 1, wherein the molar ratio of trimellitic anhydride to said polyol in said reaction product is 1:2.3.

4. The aqueous dispersion according to claim 1, wherein the molar ratio of trimellitic anhydride to said polyol in said reaction product is 1:2.5.

5. The aqueous dispersion according to claim 1, wherein the molar ratio of trimellitic anhydride to said polyol in said reaction product is 1:3.

6. The aqueous dispersion according to claim 1, wherein the molar ratio of trimellitic anhydride to said polyol in said reaction product is 1:3.3.

7. The aqueous dispersion according to claim 1, wherein said polyol is a polyester polyol.

8. The aqueous dispersion according to claim 7, wherein said polyester polyol comprises a condensation reaction product of a diol and a diacid.

9. The aqueous dispersion to claim 8, wherein said diol comprises 1,6-hexanediol, butylethylpropanediol, 1,4-cyclohexanedimethanol, 2-methyl-1,3-propanediol, polytetramethylene ether glycols and its oligomers, polytetrahydrofuran and its oligomers, dipropylene glycol, neopentyl glycol, butane diol, tripropylene glycol, or combinations thereof.

10. The aqueous dispersion according to claim 8, wherein said diacid comprises isophthalic acid, terephthalic acid, 1,4-Cyclohexanediacid, dimerized fatty acids, maleic anhydride, hexahydrophthalic anhydride, methylhexahydrophthalic anhydride, tetrahydrophthalic anhydride, phthalic anhydride, adipic acid, azelaic acid, or combinations thereof.

11. The aqueous dispersion according to claim 1, wherein said anhydride is trimellitic anhydride.

12. The aqueous dispersion according to claim 1, wherein said another reaction product is further reacted with a monomer to form a polyester-acrylate copolymer.

13. A coating composition comprising the aqueous dispersion of claim 1.

14. The coating composition according to claim 13, wherein said coating composition further comprises a crosslinker.

15. The coating composition according to claim 13, wherein said coating composition is a 1K system.

16. The coating composition according to claim 13, wherein said coating composition is a 2K system, and wherein said aqueous dispersion is in a first component and a crosslinking material is another component.

* * * * *